United States Patent [19]

Arai

[11] Patent Number: 5,741,968
[45] Date of Patent: Apr. 21, 1998

[54] FLOW DETECTING ASSEMBLY

[75] Inventor: Mayumi Arai, Tokyo, Japan

[73] Assignee: MKS Japan, Inc., Tokyo, Japan

[21] Appl. No.: 660,236

[22] Filed: Jun. 7, 1996

[30] Foreign Application Priority Data

Jun. 14, 1995 [JP] Japan .................................. 7-147018

[51] Int. Cl.$^6$ .................................................. G01F 1/68
[52] U.S. Cl. .................................................. 73/204.22
[58] Field of Search .................................... 73/204.22

[56] References Cited

U.S. PATENT DOCUMENTS

| 3,500,686 | 3/1970 | Bell, III | 73/204.22 |
| 4,384,578 | 5/1983 | Winkler | 73/204.22 |
| 4,648,270 | 3/1987 | Johnson et al. | 73/204.22 |
| 5,259,243 | 11/1993 | Drexal et al. | 73/204.22 |

*Primary Examiner*—Richard Chilcot
*Assistant Examiner*—Jewel V. Artis
*Attorney, Agent, or Firm*—Wenderoth, Lind & Ponack

[57] ABSTRACT

Elastic members are retained in respective recesses of open boxes. Heating (cooling) temperature sensing elements are held on the elastic member. A pipe which has already been laid is sandwiched between the open boxes such that the heating (cooling) temperature sensing elements join to desired positions, respectively, of the existing pipe. The pipe is subjected to a temperature change by the heating (cooling) temperature sensing elements, and hence the fluid therein is subjected to a temperature change, causing a temperature gradient to occur between the upper and lower streams of the fluid flow. The temperature gradient is detected by the heating (cooling) temperature sensing elements, and a flow rate of the fluid flowing through the pipe is obtained on the basis of the outputs of the sensing elements.

4 Claims, 5 Drawing Sheets

FLOW DETECTING ASSEMBLY

BACKGROUND OF THE INVENTION

1. Field of the Invention

The present invention relates to a flow detecting assembly including a piping that has previously been laid to enable detection of the flow rate of a fluid flowing through the existing piping.

2. Description of the Related Art

Hitherto, the flow rate of a fluid flowing through a piping has been detected by leading the fluid to a sensor pipe of a flow detecting apparatus which has been incorporated into the piping during the laying thereof. That is, the conventional flow detecting apparatus has a sensor pipe and must be connected to the piping such that the fluid flows through the sensor pipe.

Therefore, in order to detect the flow rate of a fluid flowing through a piping which has already been laid, it is necessary to cut off a portion of a pipe at the position for detection and to install a flow detecting apparatus at the detection position. For this reason, it is necessary to shut down a plant or the like in which the fluid is flowing in order to conduct the necessary installation operation. Thus, the installation of a flow detecting system requires a troublesome operation, and it may be impossible to realize flow detection depending on the type of piping. Accordingly, it has been demanded to develop a system to enable detection of the flow rate of a fluid flowing through a pipe which has already been laid without affecting the pipe.

SUMMARY OF THE INVENTION

In view of the above-described disadvantages of the conventional flow detecting apparatus, it is an object of the present invention to provide an assembly enabling detection of the flow rate of a fluid flowing through a pipe which has already been laid without affecting the pipe, thereby meeting the above-described demand.

According to a first aspect of the present invention, there is provided a flow detecting assembly including a heating or cooling device joined to a surface of a pipe laid to pass a fluid therethrough, and first and second temperature detecting devices joined to two points or location, respectively, on the surface of the pipe to detect temperatures at their respective positions, whereby the flow rate of the fluid flowing through the pipe is obtained on the basis of the outputs of the first and second temperature detecting devices.

According to a second aspect of the present invention, the flow detecting assembly further includes a flow detecting circuit for obtaining a flow rate of the fluid flowing through the pipe on the basis of the outputs of the first and second temperature detecting devices.

According to a third aspect of the present invention, the flow detecting assembly further includes an elastic member for holding the heating or cooling device and the temperature detecting devices and pressing these devices against the pipe, and a retaining member for retaining the elastic member. The retaining member has a portion for passing the pipe laid to pass a fluid therethrough.

According to a fourth aspect of the present invention, the retaining member is an enclosure comprising a pair of open boxes which are two splittable halves. The enclosure is formed from a material having thermal conductivity, and is detachably attached to the, pipe.

According to a fifth aspect of the present invention, there is provided a flow detecting assembly including a heating or cooling device joined to a surface of a pipe laid to pass a fluid therethrough, and a temperature detecting device joined to the surface of the pipe to detect a temperature at a position where the temperature detecting device is provided, whereby a flow rate of the fluid flowing through the pipe is obtained on the basis of the output of the temperature detecting device. cooling device and the temperature detecting devices are joined to a desired position of a pipe which has already been laid. The pipe is subjected to a temperature change by the heating or cooling device, and hence the fluid therein is subjected to a temperature change, causing a temperature gradient to occur between the upper and lower streams of the fluid flow. The temperature gradient is detected by the temperature detecting devices, and a flow rate of the fluid flowing through the pipe is obtained on the basis of the outputs of the temperature detecting devices.

In the flow detecting assembly according to the second aspect of the present invention, the flow detecting circuit detects a flow rate of the fluid flowing through the pipe on the basis of the outputs of the first and second temperature detecting devices.

In the flow detecting assembly according to the third aspect of the present invention, the heating or cooling device and the temperature detecting devices are held and pressed against the surface of the pipe. In this way, the heating or cooling device and the temperature detecting devices are fitted to a pipe which has already been laid to pass a fluid therethrough such that the existing pipe extends through the inside of the apparatus.

In the flow detecting assembly according to the fourth aspect of the present invention, a pair of open boxes which comprise two splittable halves of an enclosure are detachably attached to the pipe.

In the flow detecting assembly according to the fifth aspect of the present invention, a heating or cooling device and a temperature detecting device are joined to a desired position of a pipe which has already been laid. The pipe is subjected to a temperature change by the heating or cooling device, and hence the fluid therein is subjected to a temperature change, causing a temperature change to occur at a predetermined position in the flow of the fluid. The temperature change is detected by the temperature detecting device, and a flow rate of the fluid flowing through the pipe is obtained on the basis of the output of the temperature detecting device.

DESCRIPTION OF PREFERRED EMBODIMENTS

Figure 1:
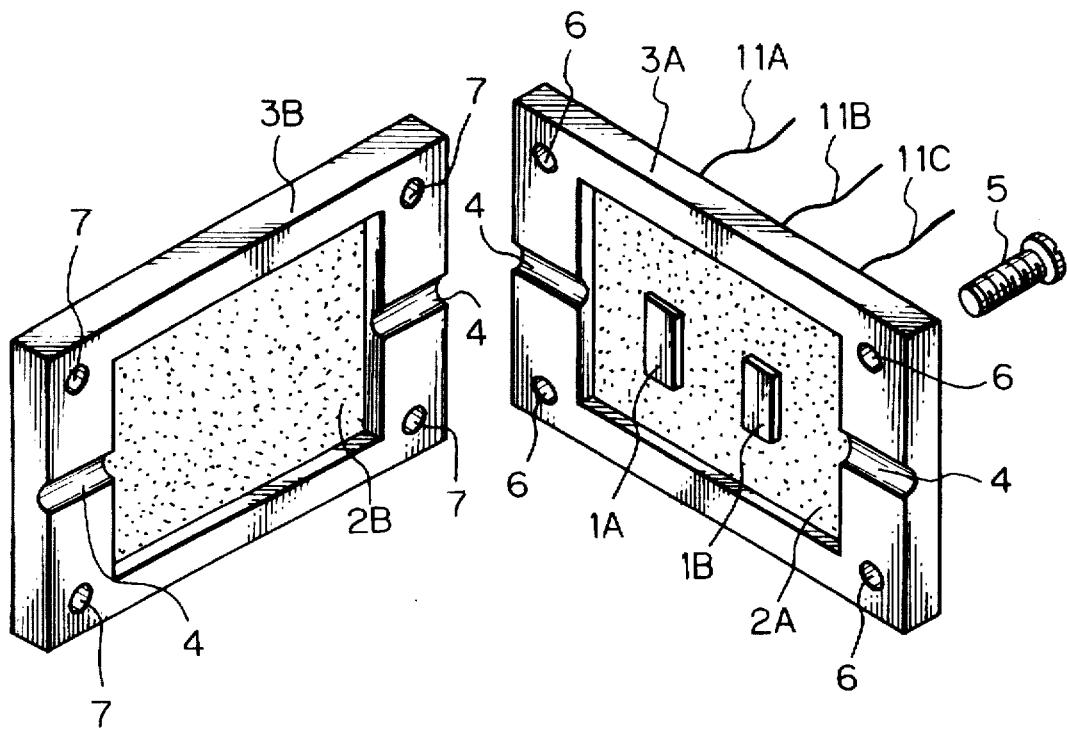
FIG. 1 is an exploded perspective view of a flow detecting apparatus according to one embodiment of the present invention.
Figure 3:
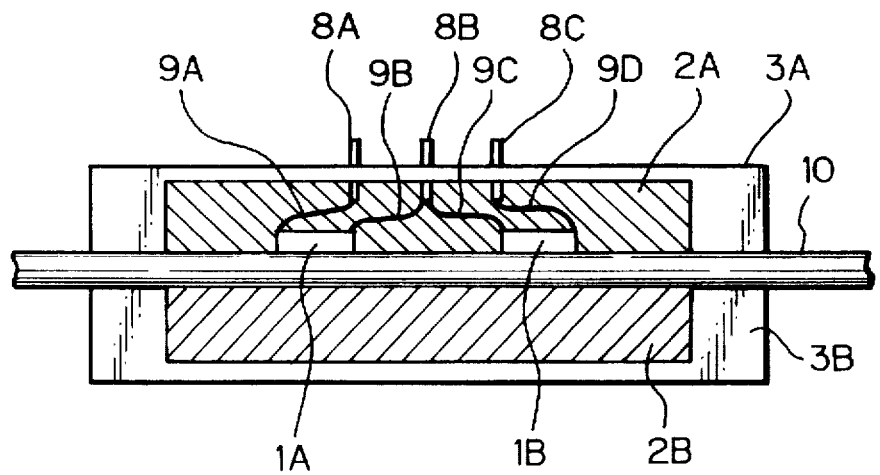
FIG. 3 is a sectional view of the flow detecting apparatus according to one embodiment of the present invention as fitted to a pipe which has already been laid.
Figure 4:
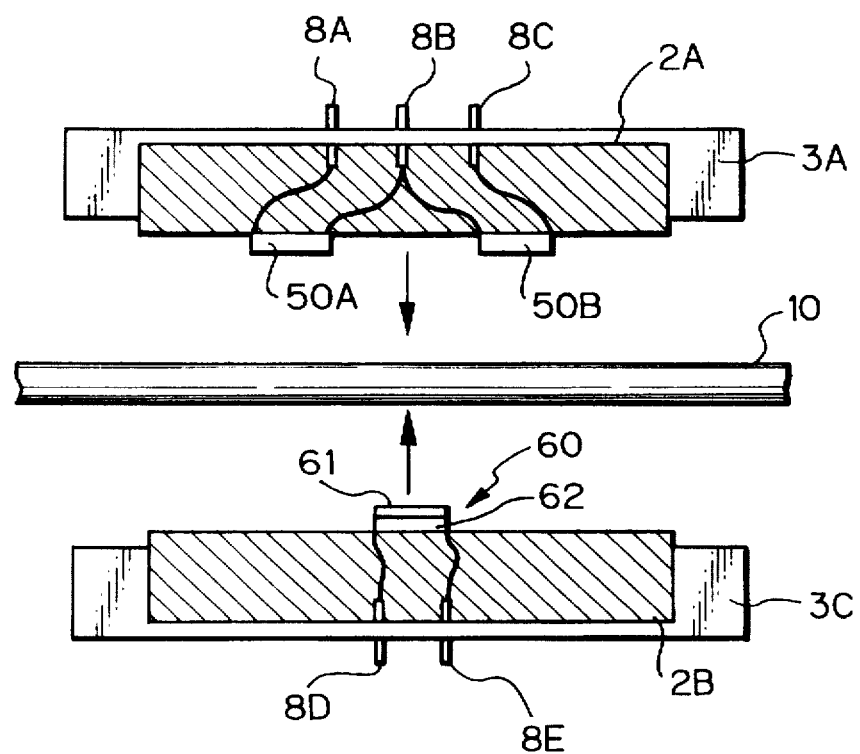
FIG. 4 is a sectional view showing the way in which a flow detecting apparatus according to another embodiment of the present invention is fitted to a pipe which has already been laid.

Embodiments of the flow detecting apparatus and method according to the present invention will be described below with reference to the accompanying drawings. In the drawings, the same constituent elements are denoted by the same reference characters, and repeated description thereof is omitted. FIG. 1 is a perspective view of a flow detecting apparatus according to one embodiment of the present invention. In this embodiment, the flow detecting apparatus has a heating or cooling device provided to join to a pipe laid to pass a fluid therethrough, and a pair of heating (cooling) temperature sensing elements 1A and 1B which are first and second temperature detecting devices provided to join to two points, respectively, on the pipe to detect temperatures at the respective positions. The heating (cooling) temperature sensing elements 1A and 1B are, for example, each based on an element formed by depositing a platinum fine wire pattern on a ceramic substrate. When only such an element is used, it is disposed such that the platinum fine wire pattern side of the element does not join to the pipe. That is, in the illustrated state, each element is disposed such that the platinum fine wire pattern side is the reverse side. The heating (cooling) temperature sensing elements 1A and 1B are held on a heat-insulating elastic member 2A which is formed from a sponge or rubber material. The elastic member 2A presses the heating (cooling) temperature sensing elements 1A and 1B against the pipe so that the pipe and the heating (cooling) temperature sensing elements 1A and 1B are properly joined to each other. The elastic member 2A is retained by an open box 3A which is a retaining member for the elastic member 2A. That is, the open box 3A unites with another open box 3B to constitute one enclosure. The enclosure is formed from a material having thermal conductivity, and is arranged to be detachable with respect to the pipe. The open boxes 3A and 3B are two halves of a rectangular parallelepiped enclosure. The open boxes 3A and 3B have recesses formed in respective central portions thereof to accommodate elastic members 2A and 2B, respectively. The open boxes 3A and 3B each have grooves 4 formed in the centers of two longitudinal end portions thereof to pass a pipe which has already been laid to pass a fluid therethrough. In the four corners of the open box 3A are formed holes 6 for receiving bolts or screws 5. Tapped holes 7 are formed in the open box 3B at respective positions corresponding to the holes 6. It should be noted that, in FIG. 1, the elastic members 2A and 2B are depicted at respective positions lower than the surfaces of the open boxes 3A and 3B for the convenience of illustration. In actuality, however, the elastic members 2A and 2B slightly project from the surfaces of the open boxes 3A and 3B, as shown in FIG. 4. Thus, when the open boxes 3A and 3B are secured together by the screws 5 with an existing pipe 10 sandwiched therebetween, as shown in FIG. 3, the elastic members 2A and 2B join to the surface of the pipe 10 and press the heating (cooling) temperature sensing elements 1A and 1B against the pipe 10 by elasticity, thereby enabling the pipe 10 and the heating (cooling) temperature sensing elements 1A and 1B to be properly joined to each other, and further preventing destruction of the heating (cooling) temperature sensing elements 1A and 1B. It should be noted that the pipe that has already been laid must be a pipe made of a material having thermal conductivity, e.g., a metallic material, and capable of transmitting the heat of a fluid in the pipe to the heating (cooling) temperature sensing elements 1A and 1B.

In the flow detecting apparatus arranged as described above, as shown in FIG. 3, the open boxes 3A and 3B are disposed to face each other with the existing pipe 10 sandwiched therebetween, and are joined together by using the screws 5 to form one enclosure. The open box 3A has three studs 8A to 8C which extend therethrough from the rear side to project into the recess of the open box 3A. A lead wire 9A extending from the heating (cooling) temperature sensing element 1A is connected to the stud 8A. Further, lead wires 9B and 9C extending from the heating (cooling) temperature sensing elements 1A and 1B are connected to the stud 8B, and a lead wire 9D extending from the sensing element 1B is connected to the stud 8C. Reference characters 11A to 11C in FIG. 1 denote lead wires extending from the studs 8A to 8C to a display unit 200 (200A), described later.

Figure 5:
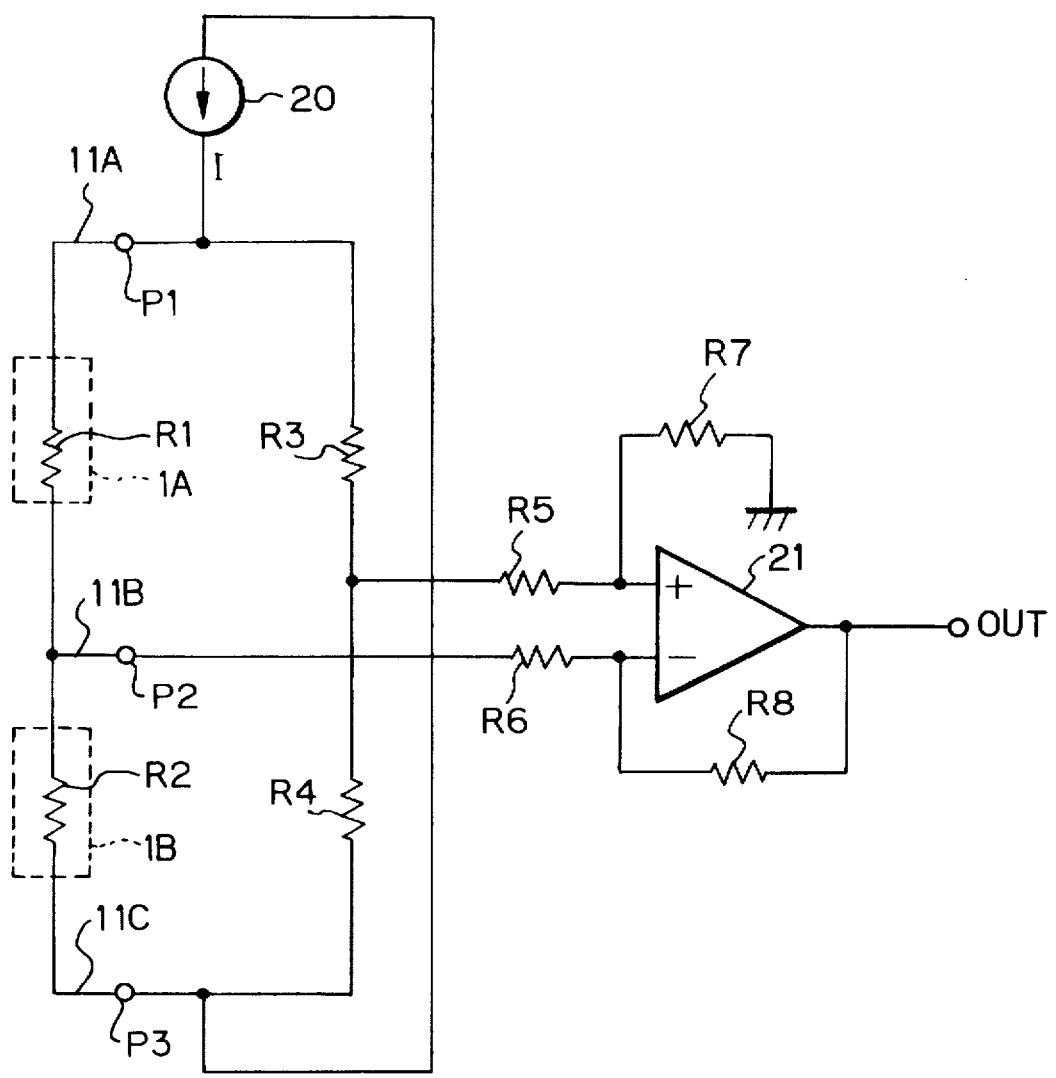
FIG. 5 shows the arrangement of a flow detecting circuit used in a flow detecting apparatus according to one embodiment of the present invention.

The lead wires 11A to 11C are connected to respective nodes P1 to P3 of a flow detecting circuit shown in FIG. 5. The flow detecting circuit, 150 in FIG. 7 has resistors R3 and R4 which constitute a bridge circuit in combination with the resistors R1 and R2 of the heating (cooling) temperature sensing elements 1A and 1B. The flow detecting circuit 150 further has a constant-current source 20 for supplying an electric current to the bridge circuit, a differential amplifier 21, and resistors R5 to R8 constituting a peripheral circuit thereof. When no fluid is flowing through the pipe 10, R1=R2 and the bridge circuit is in an equilibrium state. When a fluid flows through the pipe 10 from the heating (cooling) temperature sensing element 1B side toward the heating (cooling) temperature sensing element 1A side, voltages are developed across the resistors R1 and R2 of the heating (cooling) temperature sensing elements 1A and 1B by the current supplied from the constant-current source 20. At this time, the flow of the fluid causes a temperature difference between the positions of the heating (cooling) temperature sensing elements 1A and 1B, resulting in a resistance difference between the sensing elements 1A and 1B, and thus causing voltages V1 and V2 to occur. A difference (V1−V2) between the voltages V1 and V2 is taken from the differential amplifier 21, and thus a mass flow rate can be obtained. That is, the mass flow rate Q is equivalent to an electric power displacement in the heating (cooling) temperature sensing elements 1A and 1B which occurs when the fluid flows. In other words, assuming that the current supplied from the constant-current source 20 is I, the mass flow rate Q is proportional to (IV1−IV2). Because the current I is constant, a mass flow rate can be detected directly from the voltage difference (V1−V2).

Figure 7:
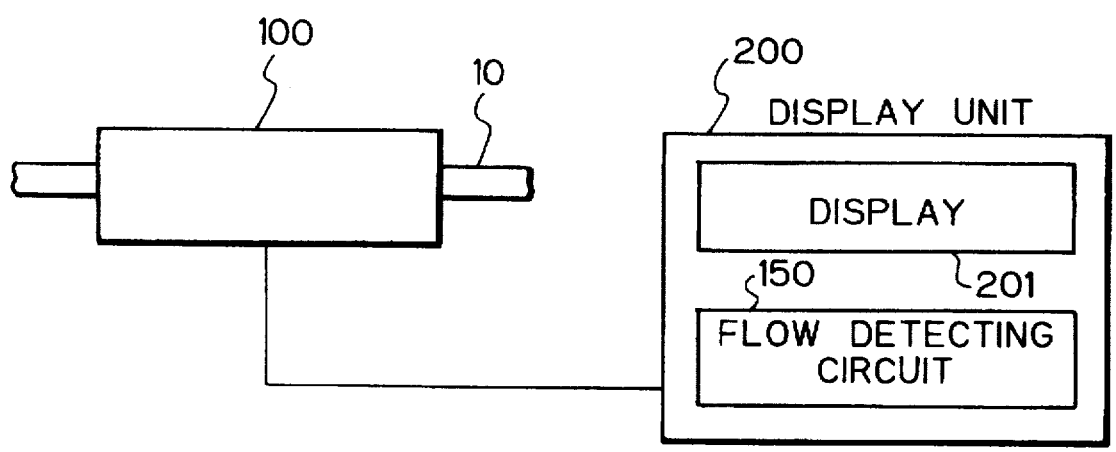
FIG. 7 is a block diagram of a flow detecting system arranged by using a flow detecting apparatus according to one embodiment of the present invention.

As shown in FIG. 7, the flow detecting circuit 150, shown in FIG. 5, is mounted in the display unit 200, which is separate from the flow detecting apparatus 100. The output of the flow detecting circuit 150 is supplied to a display 201 and displayed as flow rate data after being subjected to arithmetic processing, conversion processing, etc. if necessary. Because the flow detecting apparatus 100 is fitted to the existing pipe 10 in actual use, the detection accuracy of the apparatus 100 is not necessarily high under the conditions that the fluid flowing through the pipe 10 does not form a laminar flow. In this case, therefore, the flow rate may be displayed in the form of an analog value with a needle indicating a scale, as well as a digital value.

Figure 8:
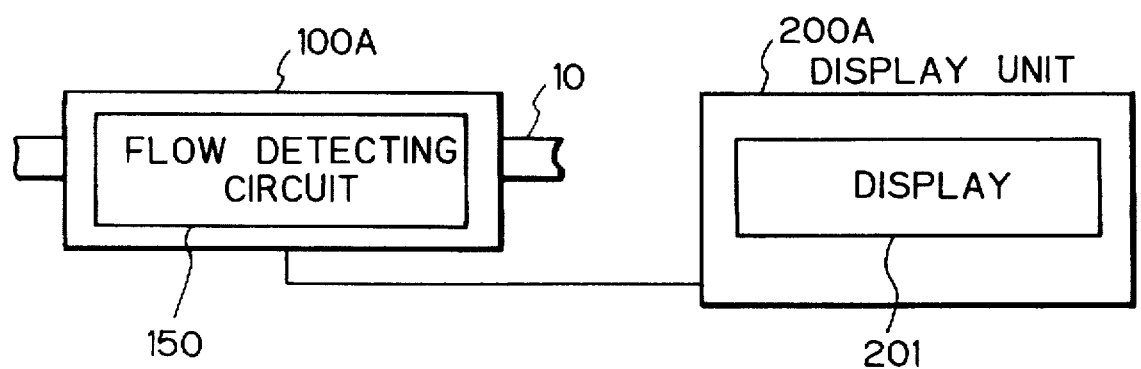
FIG. 8 is a block diagram of a flow detecting system arranged by using a flow detecting apparatus according to another embodiment of the present invention.

FIG. 8 shows a flow detecting system in which the flow detecting circuit 150, shown in FIG. 5, is mounted in the flow detecting apparatus 100A. In this case, the display unit 200A is provided with only the display 201. Either the arrangement shown in FIG. 7 or that shown in FIG. 8 can be adopted.

Figure 2:
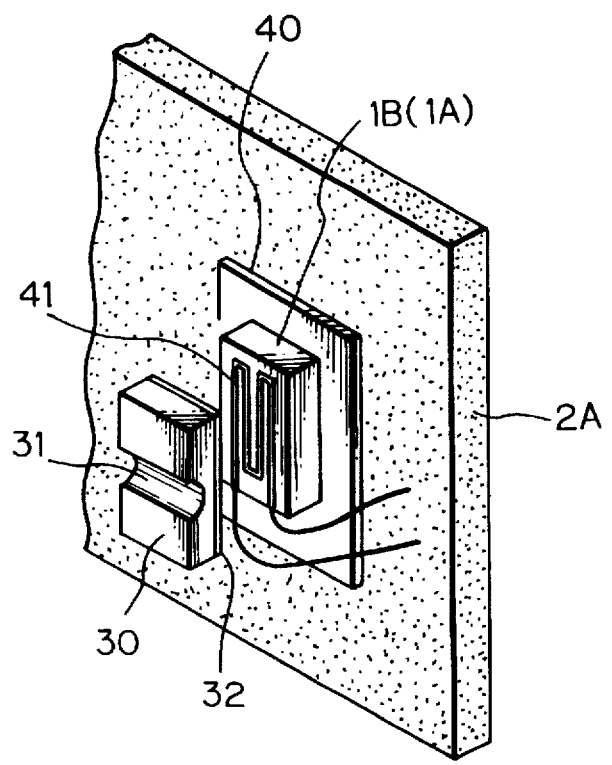
FIG. 2 is an exploded perspective view of an essential part of the flow detecting apparatus according to one embodiment of the present invention.

FIG. 2 shows an example in which a heating or cooling device mounted on the heat-insulating elastic member 2A comprises a heating (cooling) temperature sensing element 1B (1A), a fitting member 30, and a heat-conductive member 40. The fitting member 30 is formed from a rectangular parallelepiped-shaped good thermal conductor (metal) which is fitted over the surface of the heating (cooling) temperature sensing element 1B (1A). The fitting member 30 is bonded to the surface of the heating (cooling) temperature sensing element 1B (1A) with an insulating film 32 interposed therebetween. In this case, heating (cooling) temperature sensing element 1B (1A) is disposed such that the platinum fine wire pattern 41 lies on the observe side, i.e. the side of the pipe. The heat-conducting member 40 is formed in the shape of a plate having a surface wider than the bottom area of the heating (cooling) temperature sensing element 1B (1A). The heat-conducting member 40 is provided on the reverse side of the heating (cooling) temperature sensing element 1B (1A) to make uniform the temperature of the sensing element 1B (1A), i.e. to perform a thermal diffusion function. The fitting member 30 has a groove 31 which is transversely formed in the center of the surface thereof in conformity to the diameter of the existing pipe. The heating (cooling) temperature sensing element 1B (1A), the fitting member 30, and the heat-conducting member 40 are integrated together and bonded to the elastic member 2A.

The above-described arrangement enables the fitting member 30 to be properly fitted to the existing pipe and hence allows accurate heat flow between the fluid and the heating (cooling) temperature sensing element 1B (1A). Further, the heat-conducting member 40 enables the temperature of the heating (cooling) temperature sensing element 1B (1A) to be made uniform, thereby allowing proper and accurate measurement.

Figure 6:
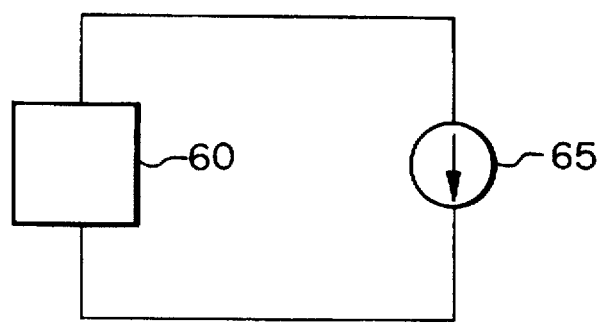
FIG. 6 shows an arrangement for supplying an electric current to a Peltier element used in a flow detecting apparatus according to one embodiment of the present invention.

FIG. 4 shows a flow detecting apparatus according to another embodiment of the present invention. In this embodiment, platinum resistance bulbs 50A and 50B are held on the elastic member 2A and joined to a pipe 10 which has already been laid, thus functioning as temperature detecting devices. An open box 3C which is paired with the open box 3A has studs 8D and 8E which extend therethrough from the reverse side to project into the recess of the open box 3C. A Peltier element 60 for cooling the pipe 10 is held in the center of the surface of the elastic member 2B. The Peltier element 60 has a cooling portion 61 on the observe side and a heating portion 62 on the elastic member 2B side. As shown in FIG. 6, the Peltier element 60 is supplied with an electric current from a constant-current source 65 to cool the pipe 10 to a predetermined temperature.

A flow detecting system that uses the flow detecting apparatus arranged as described above may be formed by adding the arrangement for supplying a current to the Peltier element 60, shown in FIG. 6, to the arrangement shown in FIG. 7 or 8. With this system configuration, a portion of the pipe 10 near the heating (cooling) temperature sensing elements 1A and 1B is cooled by the Peltier element 60, and a temperature gradient is produced between the position of the heating (cooling) temperature sensing element 1A and the position of the heating (cooling) temperature sensing element 1B by the flow of the fluid through the pipe 10. Thus, a signal corresponding to the mass flow rate is obtained from the output of the flow detecting circuit 150, shown in FIG. 5, and the mass flow rate is displayed on the display 201 shown in FIG. 7 or 8, as has already been described.

Although in the embodiment shown in FIG. 4 the cooling portion 61 of the Peltier element 60 lies at the observe side, in another embodiment the heating portion 62 lies at the observe side of the Peltier element 60 to heat the pipe 10 for measurement. In such a case also, the flow rate of the fluid flowing through the existing pipe can be detected in the same way as in the embodiment shown in FIG. 4. The arrangement may also be such that a matching resistor, as disclosed in Japanese Patent Application No. 3-181515, is mounted on the flow detecting apparatus according to either of the foregoing embodiments, and the flow detecting circuit is modified as shown in such prior application.

Figure 9:
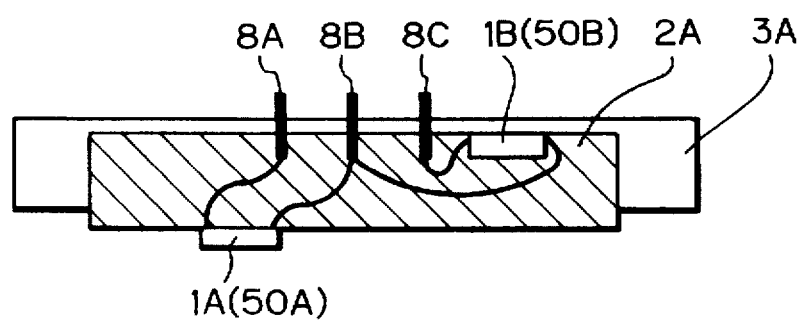
FIG. 9 is a sectional view showing the arrangement of an essential part of a flow detecting apparatus according to another embodiment of the present invention.

FIG. 9 shows an embodiment in which the heating (cooling) temperature sensing element 1A (50A) is fitted to the pipe 10, and the heating (cooling) temperature sensing element 1B (50B) is arranged to detect the temperature of the open box 3A (i.e., room temperature). In this embodiment also, when no fluid flows through the pipe 10, R1=R2 and the bridge circuit is in an equilibrium state. When a fluid flows through a portion of the pipe 10 corresponding to the position of the heating (cooling) temperature sensing element 1A, voltages are developed across the resistors R1 and R2 of the heating (cooling) temperature sensing elements 1A and 1B by the current supplied from the constant-current source 20. At this time, the flow of the fluid causes a temperature difference between the positions of the heating (cooling) temperature sensing elements 1A and 1B, resulting in a resistance difference between the sensing elements 1A and 1B, and thus causing voltages V1 and V2 to occur. A difference (V1−V2) between the voltages V1 and V2 is taken from the differential amplifier 21, and thus a mass flow rate can be obtained. Accordingly, the heating (cooling) temperature sensing element 1B may be a fixed resistor. In this case also, the bridge circuit, shown in FIG. 5, is in an equilibrium state when no fluid flows through the pipe 10. When a fluid flows, the resistance of the heating (cooling) temperature sensing element 1A changes, causing the equilibrium of the bridge circuit to be destroyed. Consequently, a difference (V1−V2) between the two voltages V1 and V2 is taken from the differential amplifier 21, and thus a mass flow rate can be obtained. In the embodiment wherein the heating (cooling) temperature sensing element 1B is a fixed resistor, the fixed resistor constitutes a part of the flow detecting circuit 150, and whether or not to mount it on the open box 3A may be decided as desired.

As has been described above, the flow detecting apparatus according to the present invention enables a heating or cooling device and a temperature detecting device to be joined to a desired position of a piping which has already been laid, and thus makes it possible to obtain a flow rate of a fluid flowing through a pipe of the existing piping.

According to another aspect of the present invention, the flow detecting apparatus, including a flow detecting circuit, can be installed at a desired position of the existing piping. Thus, the flow rate of a fluid flowing through a pipe of the existing piping can be obtained from the output of the flow detecting circuit.

According to another aspect of the present invention, the heating or cooling device and the temperature detecting device are fitted to a pipe at a predetermined position in the existing piping, thereby enabling the flow rate to be properly detected.

According to another aspect of the present invention, the heating or cooling device and the temperature detecting device are detachably fitted to a pipe of the existing piping by using a pair of open boxes which comprise two splittable halves of an enclosure, thereby enabling the flow rate to be properly detected.

According to the flow detecting method of the present invention, a heating or cooling device and a temperature detecting device are joined to a desired position of a piping which has already been laid, thereby enabling detecting of a flow note of a fluid flowing through a pipe of the existing piping.

What is claimed is:

1. A flow detecting assembly comprising:
    a one-piece pipe laid to pass a fluid therethrough and formed of a good thermal conductive and homogeneous material;
    first and second heating or cooling and thermal sensitive means disposed in contact with any two locations on an outer surface of said pipe and spaced from each other by a predetermined distance in a longitudinal direction of said pipe, each of said first and second heating or cooling and thermal sensitive means heating or cooling said pipe to a predetermined temperature and detecting the temperature at their respective locations;
    a housing securing said first and second heating or cooling and thermal sensitive means on said surface of said pipe, said housing comprising a pair of open boxes which are two splittable halves and which are formed of a thermal conductive material, and elastic members which are formed of an elastic and thermal insulating material and are disposed within each of said open boxes, said elastic members holding said pipe and said heating or cooling and thermal sensitive means in close contact with each other and thermally insulating said pipe and said first and second heating or cooling and thermal sensitive means from said open boxes, said a pair of open boxes being provided at any position on said pipe while being secured to each other in a condition in which said open boxes surround said outer surface of said pipe;
    a flow detecting means for obtaining a flow rate of the fluid flowing through said pipe on the basis of outputs of said first and second heating or cooling and thermal sensitive means; and
    said heating or cooling and thermal sensitive means having structure achieving insulation and thermal diffusion functions.

2. A flow detecting assembly according to claim 1, wherein opposite ends of each of said open boxes in said longitudinal direction of said pipe directly contact said pipe, thereby eliminating any influence due to possible changes in atmospheric temperature.

3. A flow detecting assembly comprising:
    a one-piece pipe laid to pass a fluid therethrough and formed of a good thermal conductive and homogeneous material;
    first and second thermal sensitive means disposed in contact with any two locations on an outer surface of said pipe spaced from each other by a predetermined distance in a longitudinal direction of said pipe, each of said first and second thermal sensitive means detecting the temperature at their respective locations;
    a heating or cooling means which is disposed in contact with said surface of said pipe and is positioned between said first thermal sensitive means and said second thermal sensitive means in said longitudinal direction of said pipe, said heating or cooling means heating or cooling said pipe to a predetermined temperature;
    a housing securing said first and second thermal sensitive means and said heating or cooling means on said surface of said pipe, said housing comprising a pair of open boxes which are two splittable halves and which are formed of a thermal conductive material, and elastic members which are formed of an elastic and thermal insulating material and are disposed within each of said open boxes, said elastic members holding said pipe and said thermal sensitive means and said heating or cooling means in close contact with each other and thermally insulating said pipe and said first and second thermal sensitive means and said heating or cooling means from said open boxes, said a pair of open boxes being provided at any position on said pipe while being secured to each other in a condition in which said open boxes surround said outer surface of said pipe;
    a flow detecting means for obtaining a flow rate of the fluid flowing through said pipe on the basis of outputs of said first and second thermal sensitive means; and
    said heating or cooling and thermal sensitive means having structure achieving insulation and thermal diffusion functions.

4. A flow detecting assembly according to claim 3 wherein opposite ends of each of said open boxes in said longitudinal direction of said pipe directly contact said pipe, thereby eliminating any influence due to possible changes in atmospheric temperature.

* * * * *